United States Patent Office 2,698,250
Patented Dec. 28, 1954

2,698,250
RESINOUS COMPOSITIONS

William G. Leichner, Fort Wayne, Ind.

No Drawing. Application February 28, 1951,
Serial No. 213,297

6 Claims. (Cl. 106—36)

This invention relates to resinous compositions and more particularly to compositions comprising chiefly resin plasticized with hydroabietyl alcohol, the ingredients being dissolved in organic solvent to provide a liquid coating composition having particular utility as a nonslip coating.

It is an object of this invention to provide an improved resinous coating composition which is suitable for application to a surface to effect increased frictional resistance to the slippage of a contacting surface thereover.

Another object of the invention is to provide a composition which may be applied to the fingers or hands of a person to increase their grip, or, if desired, may be applied directly to the handle of tools, implements, or the like, to facilitate grasping and firmly holding the same. For example, the composition of the invention is readily applied to the handles of hammers, axes, saws, fishing poles, golf clubs, tennis racquets, baseball bats, etc., as well as machine parts, such as steering wheels, levers, and the like, where it is desired to provide a surface having a high resistance to the slippage of contacting surfaces thereover. The composition also may be utilized in lieu of garters or the like to hold up stockings or socks, a suitable band or strip of the composition being applied to a section of the leg and a portion of the stocking brought in contact therewith so as to adhere thereto.

In accordance with this invention these objects are attained by incorporating a resin alcohol in a resin, such as wood rosin, preferably polymerized wood rosin, and dissolving the resultant resinous mass in an organic solvent. Wood rosin is the principal and essential constituent of the composition. The resin alcohol is added in an amount sufficient to plasticize the wood rosin to the desired extent. The wood rosin will comprise at least 50% and preferably in excess of 70%, by weight, of the resinous constituent exclusive of the organic solvent, as well as any inert fillers which may be present.

The polymerized wood rosin, as preferably used, has a melting point range between about 85° and 110° C. (drop method) and may be prepared as described in the U. S. patent to Rummelsburg 2,108,928. The presence of small amounts of rosin oils in the polymerized wood rosin, which usually are found in the finished rosin product, unless removed by reduced pressure distillation, are permissible, and in some instances desirable, inasmuch as the tackiness of the composition of the invention is thereby enhanced.

Where ordinary rosin is used in place of polymerized wood rosin, a refined non-crystallizing rosin is preferably employed having a light color so that a substantially clear resinous composition is formed. As an example of a non-crystallizing refined rosin which is suitable for this purpose, that described in U. S. Patent 2,259,726 may be referred to.

The resin alcohol employed as the plasticizer for the rosin is hydroabietyl alcohol, a technical grade being described in a bulletin entitled "Abitol" by the Hercules Powder Company (1947). The hydroabietyl alcohol used, as described in said bulletin, is composed of a mixture of dehydroabietyl, dihydroabietyl and tetrahydroabietyl alcohols, and having a softening point (drop method) of 33° C.; a specific gravity at 20°/20° C. of 1.007–1.008; a weight in pounds per gallon at 20° C. of 8.34; a refractive index at 20° C. of 1.528; a flash point (Cleveland open cup) of 185–195° C.; and a flame point (Cleveland open cup) of 217–220° C.

The organic solvent used in formulating the composition of the invention is preferably ethyl alcohol or denatured ethyl alcohol of industrial grade. Other solvents or suitable mixtures thereof which may be employed are methyl alcohol, isopropyl alcohol, butyl alcohol, diacetone alcohol, turpentine, acetone, methyl isobutyl ketone, ethyl ether, dioxane, Cellosolve, benzene, xylene, ethyl acetate, butyl acetate, carbon tetrachloride, ethylene dichloride, hexane, etc., in which the resinous constituents are soluble.

The resinous compositions in accordance with this invention may be compounded by combining wood rosin and the hydroabietyl alcohol plasticizer with the solvent with or without the aid of heat. For example, using polymerized wood rosin, the same may be dissolved in the organic solvent and then the desired amount of hydroabietyl alcohol added. The resultant resinous compositions will vary from relatively viscous to low viscosity liquids depending upon the percentage amounts of the different constituents present.

Examples of plasticized polymerized wood rosin compositions of this invention are given in the following table. The parts in the table are per cent by weight. While polymerized wood rosin is the preferred resin used, since it produces a more refined and better appearing product, wood rosin may be substituted directly, in whole or in part, for polymerized wood rosin in the following examples.

*Plasticized polymerized rosin compositions*

| Constituents | Examples | | | | | |
|---|---|---|---|---|---|---|
|  | 1 | 2 | 3 | 4 | 5 | 6 |
| Polymerized Wood Rosin | 25 | 30 | 60 | 40 | 1 | 26 |
| Plasticizer (hydroabietyl alcohol) | 5 | 10 | 25 | 15 | 1 | 6 |
| Ethyl Alcohol | 70 |  | 15 |  | 98 |  |
| Ethyl Acetate |  | 60 |  |  |  |  |
| Cellosolve |  |  |  | 45 |  |  |
| Carbon Tetrachloride |  |  |  |  |  | 68 |

The resinous liquid compositions of the examples are suitable for application to the surface to be rendered non-slipping, a higher viscosity composition being preferably employed where the surface is porous and readily absorbs the coating composition. The wood rosin gives the composition the desired stickiness and the resin alcohol plasticizer prevents the rosin from flaking off and crumbling after evaporation of the solvent. For example, this flaking or crumbling is especially noticeable when the composition is applied to flexible surfaces, such as the fingers or hands. A particularly good composition for universal use consists of polymerized wood rosin 25%, hydroabietyl alcohol 5% and ethyl alcohol 70%, the percentage of constituents being by weight.

Vegetable oils, such as linseed oil or the like, may be substituted for a part of the resin alcohol plasticizer but with increased substitution of such vegetable oils for the resin alcohol the tackiness of the composition is decreased and it is less efficient, having a tendency to develop stickiness when the composition is applied to the fingers. After use the composition may be readily removed by washing the surface to which it has been applied with alcohol, or other suitable organic solvent, or by washing the same with ordinary soap and water.

It will be understood that the details and examples hereinbefore set forth are illustrative only and that the invention as broadly described and as claimed is in no way limited thereby.

What is claimed and desired to be protected by Letters Patent is:

1. A composition for use as a nonslip coating consisting of chiefly wood rosin and hydroabietyl alcohol, the mixture being dissolved in organic solvent and wherein said rosin comprises at least about 50% by weight of the wood rosin-hydroabietyl alcohol constituent, the proportionate amount by weight of rosin to hydroabietyl alcohol varying from about 1:1 to 5:1 respectively.

2. A composition for use as a nonslip coating consisting of chiefly polymerized wood rosin and hydroabietyl alcohol and organic solvent, said polymerized wood rosin comprising at least about 50% by weight of the wood rosin hydroabietyl alcohol constituent, the proportionate amount by weight of polymerized wood rosin to hydroabietyl alcohol varying from about 1:1 to 5:1 respectively.

3. A composition for use as a nonslip coating consisting by weight of polymerized wood rosin 25%, hydroabietyl alcohol 5% and ethyl alcohol 70%.

4. A composition for use as a nonslip coating consisting essentially of polymerized wood rosin and hydroabietyl alcohol to plasticize the polymerized wood rosin, the proportionate amount by weight of rosin to hydroabietyl alcohol varying from about 1:1 to 5:1 respectively, together with organic solvent to produce a liquid composition.

5. A composition for use as a nonslip coating consisting by weight of polymerized wood rosin 1%, hydroabietyl alcohol 1% and ethyl alcohol 98%.

6. A composition for use as a nonslip coating consisting of a liquid mixture of wood rosin, hydroabietyl alcohol and a short-chain aliphatic alcohol, said wood rosin being present in an amount of at least 50% by weight of the rosin-hydroabietyl alcohol mixture, said wood rosin and hydroabietyl alcohol being present in a proportionate amount by weight of between about 1:1 to 5:1 respectively.

References Cited in the file of this patent

UNITED STATES PATENTS

| Number | Name | Date |
|---|---|---|
| 2,324,671 | Bernstein | July 20, 1943 |
| 2,350,384 | Borglin | June 6, 1944 |